Figure 5:
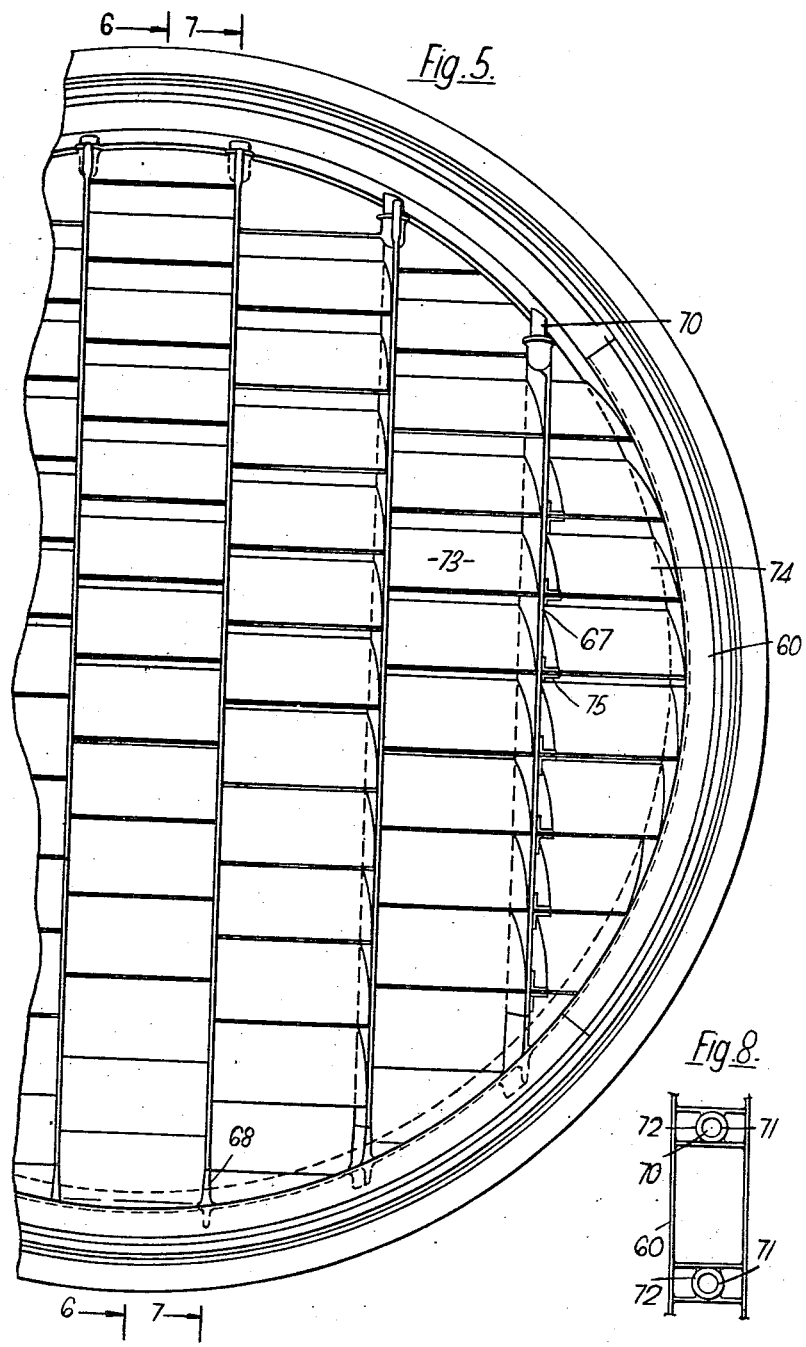

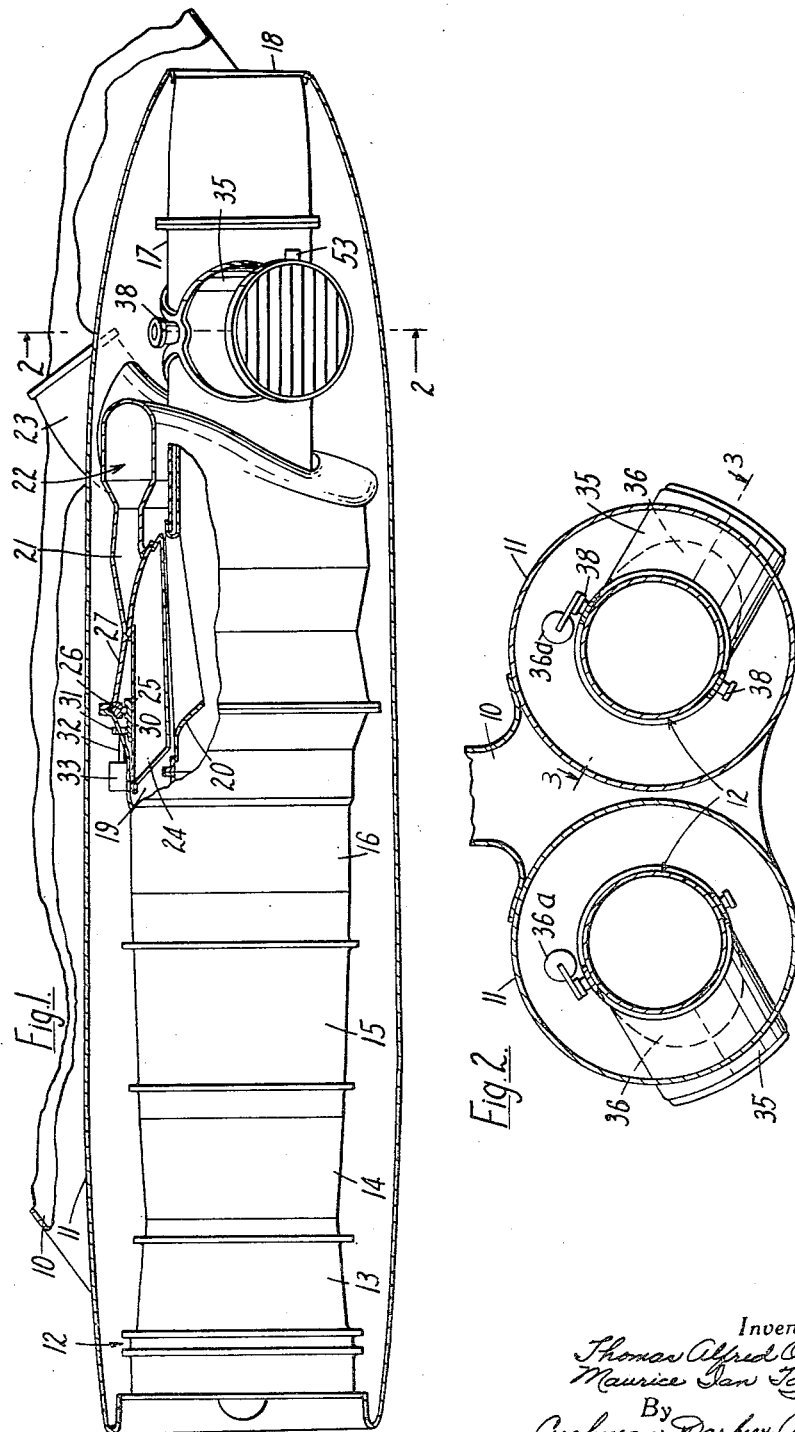

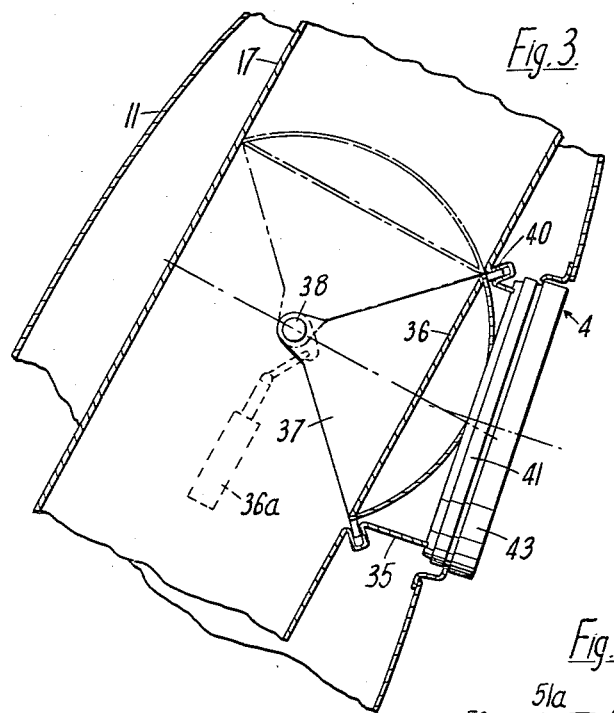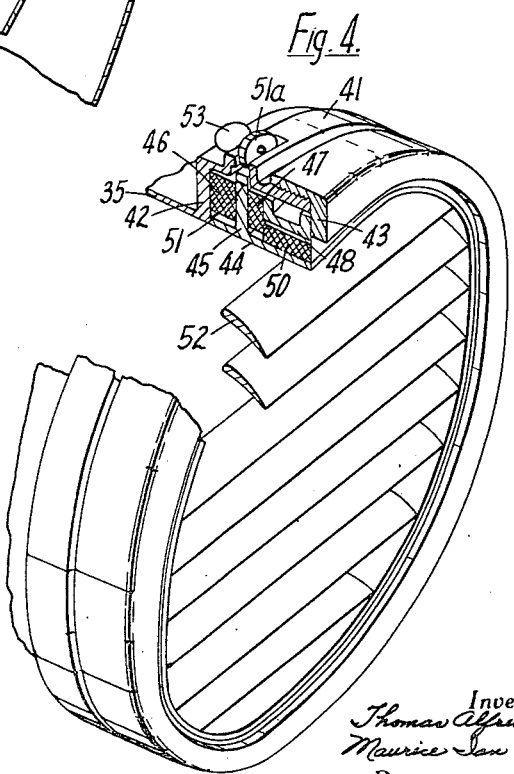

April 28, 1964  T. A. OLDFIELD ETAL  3,130,543
JET PROPULSION ENGINE

Filed May 1, 1961  4 Sheets-Sheet 3

Inventors
Thomas Alfred Oldfield
Maurice Ian Taylor
By
Cushman, Darby & Cushman
Attorneys

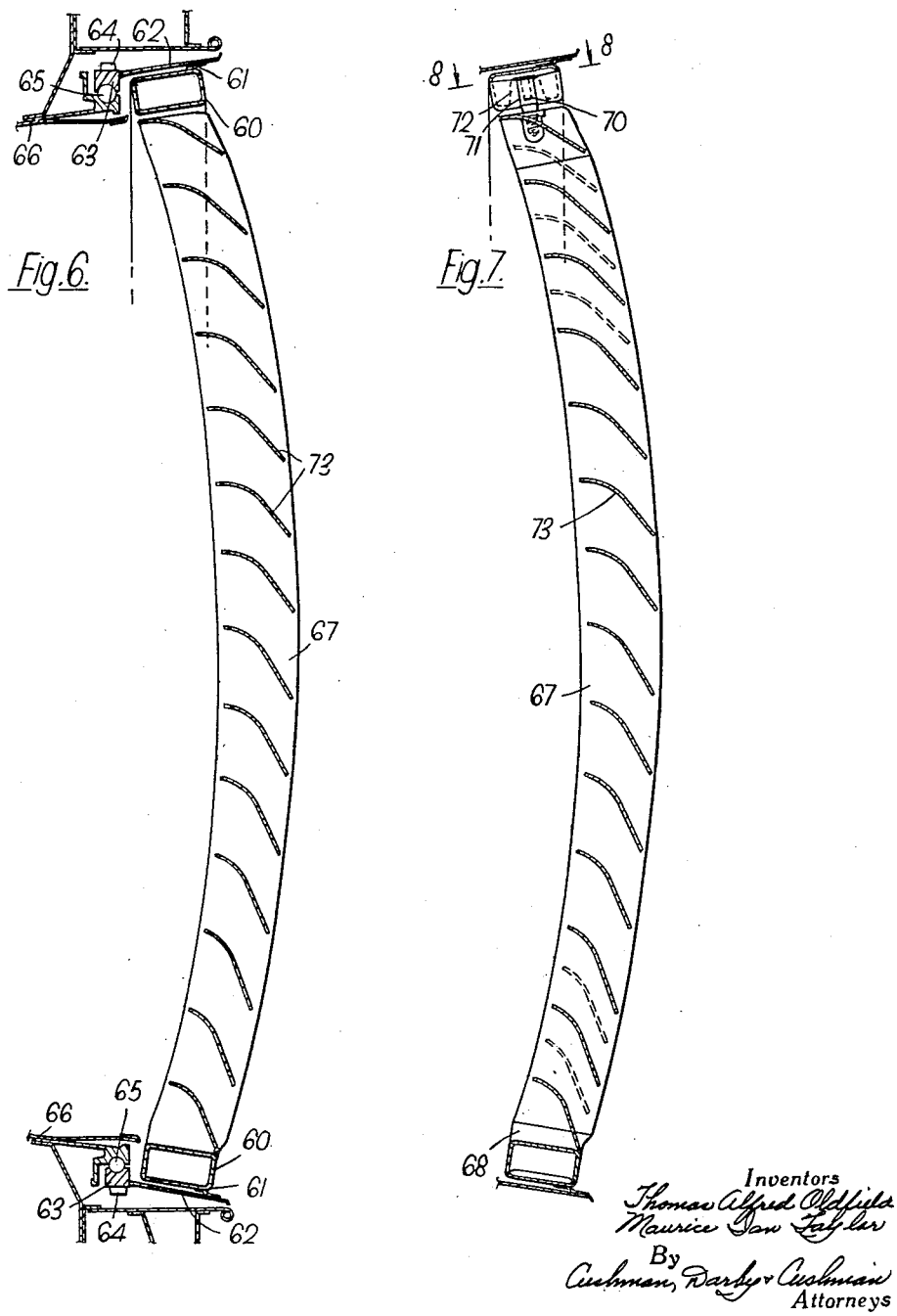

United States Patent Office 3,130,543
Patented Apr. 28, 1964

3,130,543
JET PROPULSION ENGINE
Thomas Alfred Oldfield and Maurice Ian Taylor, Allestree, Derby, England, assignors to Rolls-Royce Limited, Derby, England, a company of Great Britain
Filed May 1, 1961, Ser. No. 106,748
Claims priority, application Great Britain May 6, 1960
10 Claims. (Cl. 60—35.54)

This invention concerns jet propulsion engines for aircraft and has for its object the provision of such engines with nozzles which may be so arranged that the jet gases may be discharged therethrough in a number of different desired directions.

According to the present invention there is provided a jet propulsion engine for an aircraft, said engine having at least one exhaust duct provided with a jet propulsion nozzle throguth which the jet gases may be discharged, each said nozzle comprising a frame member which carries a plurality of jet deflector vanes which extend parallel to each other, and means for moving each frame member relatively to its exhaust duct so that the deflector vanes carried by the frame member may deflect the jet gases into desired horizontal and vertical directions.

Preferably the frame member of each exhaust duct may be moved into positions in which the jet gases may be forwardly, rearwardly and downwardly directed. The frame member may also be movable into a position in which the jet gases are upwardly directed.

The exhaust duct, or each exhaust duct, preferably communicates with the jet pipe of the engine at a point forward of the downstream end of the latter, an exhaust valve being provided which may be moved between a first position in which it prevents the jet gases from flowing out of the downstream end of the jet pipe but permits their passage through the exhaust duct or ducts, and a second position in which it permits the jet gases to flow out of the downstream end of the jet pipe but prevents their passage through the exhaust duct or ducts. The exhaust valve may comprise a part-spherical valve member carried by a part-cylindrical member which is pivotally mounted within the jet pipe.

The exhaust duct or ducts are preferably so arranged that, when the engine is disposed in a normal horizontal flight attitude, the exhaust duct or ducts extend downwardly and rearwardly therefrom.

The frame member, or each of the frame members, is preferably rotatably mounted within its respective exhaust duct. The, or each, frame member may be annular and provided with reflector vanes which are equally spaced apart from each other, each deflector vane extending completely across a chord of its annular frame member. Alternatively, the frame member, or each frame member may be annular and provided with a plurality of substantially chordally arranged support members which carry the said deflector vanes, the support members being slidably connected to the frame member and at least some of the deflector vanes being slidably connected to the support members.

The engine is preferably a by-pass gas turbine engine in which a portion of the air compressed by the compressor means of the engine is supplied to a by-pass passage so as to by-pass the combustion equipment and turbine means of the engine, the air flowing through the by-pass passage being introduced into the jet pipe by way of gas mixing means disposed upstream of the said exhaust duct or ducts. The by-pass engine may be provided with means for directing at least part of the by-pass air into an ancillary air conduit.

There may be provided a common valve mechanism for controlling communication between the by-pass passage and the said gas mixing means and for controlling communication between the by-pass passage and the ancillary air conduit, and means for moving the said common valve mechanism between a first position in which it blanks off the ancillary air conduit from the by-pass passage but opens the gas mixing means to the full flow of air passing through the by-pass passage, and a second position in which the ancillary air conduit is opened to the by-pass passage while communication between the said mixing means and the by-pass passage is restricted.

The invention also comprises an aircraft provided with a jet propulsion engine as set forth above. The said ancillary air conduit may be arranged to supply control air to attitude control nozzle means arranged on the aircraft.

Figure 8:
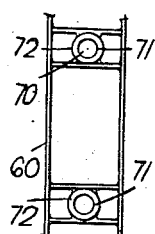

The invention is illustrated, merely by way of example, in the accompanying drawings, in which:

FIGURE 1 is an elevation partly in section, of part of an aircraft provided with jet propulsion engines according to the present invention, FIGURES 2 and 3 are sections taken respectively on the lines 2—2 of FIGURE 1 and 3—3 of FIGURE 2, FIGURE 4, which is a broken away, part sectional, perspective view taken in the direction of the arrow 4 of FIGURE 3, illustrates an assembly of jet deflector vanes, FIGURE 5 illustrates an alternative assembly of jet deflector vanes, and FIGURES 6–8 are sections taken respectively on the lines 6—6 of FIGURE 5, 7—7 of FIGURE 5, and 8—8 of FIGURE 7.

Referring to the drawings, each of the wings (not shown) of an aircraft is provided with a downwardly extending support strut 10. Each of the struts 10 supports a pair of nacelles 11, a gas turbine, forward propulsion, jet reaction engine 12 being mounted within each nacelle 11.

Each engine 12 comprises a low pressure compressor 13, a high pressure compressor 14, combustion equipment 15, and high and low pressure turbines 16. The exhaust gases which have passed through the turbines 16 pass to atmosphere through a jet pipe 17 having at its downstream end a forward propulsion nozzle 18.

Each engine 12 is of the by-pass type and has an annular by-pass passage 19 which is arranged (by means not shown) to receive compressed air from the outlet of the low pressure compressor 13 of the engine.

The annular by-pass passage 19 is arranged to supply by-pass air to the jet pipe 17 so as to mix with the jet gases therein downstream of the turbines 16. The by-pass passage 19 communicates with the jet pipe 17 by way of a series of angularly spaced apart stub pipes 20. The by-pass passage 19 is also arranged to supply by-pass air to a series of angularly spaced apart passages 21.

The passages 21 collectively constitute a volute assembly 22 which is housed within the nacelle 11 and the air from which is supplied via conduits 23 in the strut 11 to attitude control nozzles (not shown) on the aircraft. Thus the attitude control nozzles may be provided at the forward and after ends of the aircraft fuselage so as to assist in maintaining the aircraft in a desired flying attitude.

An annular sheet metal valve member 24, which is substantially part-spherical in shape, carries the inner race 25 of a ball bearing assembly whose outer race 26 is mounted within a housing 27 disposed externally of and adjacent to the downstream end of the by-pass passage 19. The annular valve member 24 has an externally toothed portion 30 which meshes with a gear 31. The gear 31 is mounted on the shaft 32 of the motor 33.

The annular valve member 24 carries a plurality of valve obturating members (not shown) which are spaced apart by angles which are substantially the same as the angles between the stub pipes 20. The annular valve member 24 is also provided with a plurality of angularly spaced apart apertures (not shown), an aperture being provided between each adjacent pair of obturating members. The apertures may be brought into and out of alignment with the passages 21. When the said apertures are out of alignment with the passages 21 no by-pass air is supplied to the latter, while the said valve obturating members permit the full flow of by-pass air from the by-pass passage 19 to be supplied to the stub pipes 20. The annular valve member 24 may, however, be rotated by the motor 33 through, say, 9° and into a position in which the apertures are aligned with the passages 21 so that the latter are supplied with by-pass air. In this position of the parts, the obturating members move so as partially to obstruct flow into the stub pipes 20 whereby the quantity of by-pass air supplied to the jet pipe 17 is reduced.

As so far described, the construction is the same as that disclosed in the co-pending United States application of Geoffrey Light Wilde and Thomas Alfred Oldfield, Serial Number 107,364, filed May 3, 1961, now Patent No. 3,115,748 wherein a fuller description of the said construction is given.

Each of the engines 12 is provided with an exhaust duct 35 which communicates with the jet pipe 17 in an area midway between the stub pipes 20 and the downstream end of the jet pipe 17. As will be seen from FIGURE 2, the exhaust ducts 35 of adjacent engines 12 extend downwardly from the latter (when the latter are in their horizontal flight attitude) and face in opposite directions.

A part-spherical exhaust valve member 36 (best shown in FIGURE 3) is carried by a part-cylindrical support member 37 which is mounted within the jet pipe 17 of each engine on diametrically oppositely disposed trunnions 38. Each valve member 36 is movable by a hydraulic or pneumatic ram 36a between the full line and dotted line positions indicated in FIGURE 3.

In the full line position, each valve member 36 engages an annular valve seat 40 carried by the respective exhaust duct 35 and prevents the jet gases from flowing into the exhaust duct 35. In the full line position, moreover, there is substantially no obstruction to gas flow through the jet pipe 17. In the dotted line position, however, each valve member 36 prevents the jet gases from flowing into the downstream part of the jet pipe 17 and forces them instead to pass through the exhaust duct 35.

Each of the exhaust ducts 35 has at its downstream end an enlarged diameter portion 41 which is connected to the upstream part of the exhaust duct 35 by a shoulder 42. Threaded onto the enlarged diameter portion 41 is an end cap 43. Within the enlarged diameter portion 41 there is rotatably mounted an annular frame member 44 having a radially extending flange 45.

The flange 45 is spaced from the shoulder 42 by an annular bearing member 46 and is spaced from the end cap 43 by an annular bearing member 47 and a trough-shaped annular spacer 48. An annular bearing member 50 is interposed between the frame member 44 and the spacer 48. The flange 45 is provided with gear teeth 51 which mesh with the teeth on a pinion 51a. An electric motor 53 is provided for rotating the pinion 51a to enable the frame member 44 to be rotated through 180°.

The frame member 44 carries a plurality of aerofoil-shaped deflector vanes 52 which extend parallel to each other and which are spaced apart by equal distances, each vane 52 extending completely across a chord of the annular frame member 44. In the position shown in FIGURE 4, jet gases flowing through the exhaust duct 35 will be substantially vertically downwardly directed. It will be appreciated, however, that, by rotating the frame member 44, the vanes 52 may be brought to positions in which they deflect the jet gases into any desired forward, rearward, upward or downward direction.

If it is desired to effect short take-off, the valve members 36 are brought to the dotted line position shown in FIGURE 3 and the frame members 44 are initially so disposed that the vanes 52 carried thereby direct the jet gases rearwardly and in a substantially horizontal direction. Towards the end of the take-off run, however, the frame members 44 are rotated so that the jet gases are deflected by the vanes 52 into a rearwardly inclined or nearly vertical direction and this setting of the vanes 52 is maintained throughout the climb. During this time, the annular valve members 24 will be in the position in which air is supplied to the volute assemblies 22 for attitude control purposes, such attitude control being necessary since there is at this stage insufficient aerodynamic control.

When the forward speed of the aircraft is sufficient to produce aerodynamically the required lift forces to maintain the aircraft in the air, the annular valve members 24 are moved to the position in which all the by-pass air is supplied to the jet pipes 17. At the same time, the engines are throttled back and the valve members 36 are moved into the full line position shown in FIGURE 3, whereby all the jet gases are directed through the forward propulsion nozzles 18.

Short landing may be effected by substantially the reverse procedure, the operation being started by deflecting the jet gases into the exhaust ducts 35 and arranging the vanes 52 so that they will initially, direct the jet gases forwardly so as to impart a braking effect.

It is also possible, when desired, to effect substantially vertical take-off by initially disposing the vanes 52 so that the jet gases are vertically downwardly directed. When sufficient height has been achieved, the vanes 52 are gradually moved into the position in which they deflect the jet gases substantially horizontally and rearwardly. At the end of this transitional stage, the engines are throttled back and the valves 24, 36 are moved together to direct all the by-pass and exhaust gas to the forward propulsion nozzles 18 whose area is designed to match the total gas flow. The reverse procedure is, of course, employed in order to effect vertical landing.

In FIGURES 5–8 there is shown an assembly of jet deflector vanes which may be substituted for the arrangement shown in FIGURE 4, and which comprises a box-section annular frame member 60. The latter is mounted, by way of an annular flexible strip 61, within an annular strip 62.

The strip 62 constitutes, in effect, a flange of an annular member 63 which is provided with a gear 64. The gear 64 is driven by means which are not shown but which may comprise an electric motor and a pinion which may respectively be generally similar to the electric motor 53 and pinion 51a of FIGURE 4.

The annular member 63 is rotatably mounted on a bearing 65 which is carried by an exhaust duct 66, the exhaust duct 66 corresponding to the exhaust duct 35 on FIGURES 1–4.

Extending substantially chordally across the box-section annular frame member 60 are a plurality of outwardly bowed support members 67 which are arranged alongside each other. One end 68 of each of the support members 67 is rigidly secured to the box-section annular frame member 60. The opposite end of each of the support members 67 is provided with a pin 70 which is slidably mounted in a bore 71, the bore 71 being provided in a boss 72 forming part of the box-section annular frame member 60.

Extending rigidly between each adjacent pair of support members 67 are a plurality of jet deflector vanes 73. Jet deflector vanes 74 are also provided which extend between the two outermost support members 67 and the adjacent portions of the box-section annular frame member 60. The vanes 74 are rigidly connected to the box-section annular frame member 60 but are connected to the said outermost support members 67 by sliding joints 75.

Since the box-section annular frame member 60 is connected to the annular member 63 by the strip 62 and flexible strip 61, the box-section annular frame member 60 is free to become slightly distorted when heated by the hot gases passing therethrough. The support members 67 are able to expand by reason of the ability of the pins 70 to slide in the bores 71, while the vanes 73, 74 are able to expand lengthwise by reason of the provision of the sliding joints 75.

We claim:

1. A jet propulsion engine for an aircraft, said engine having a jet pipe and at least one additional exhaust duct communicating laterally with the jet pipe at a point forward of the downstream end thereof, adjustable exhaust valve means mounted in said jet pipe for selectively deflecting jet gases flowing through the jet pipe into said exhaust duct, a jet propulsion nozzle carried by said exhaust duct through which the jet gases deflected by said exhaust valve means are discharged, said nozzle comprising a rotatable frame member, a plurality of substantially chordally arranged support members slidably connected to the frame member, and a plurality of parallel jet deflector vanes carried by the frame member, at least some of the deflector vanes being slidably connected to the support members, the deflector vanes serving for deflecting the jet gases discharged through said nozzle, and means for rotating said frame member relatively to said exhaust duct to alter the direction to which the jet gases are deflected by said deflector vanes, said frame member being adjustable to permit the jet gases to be deflected selectively forwardly, downwardly and rearwardly relative to said engine.

2. An engine as claimed in claim 1 in which each of said support members has two ends, one of said ends being rigidly secured to the frame member, and the other of said ends being longitudinally slidably connected to the frame member.

3. An engine as claimed in claim 1 in which the frame member may be rotated through substantially 180°.

4. An engine as claimed in claim 1 in which the frame member is also movable into a position in which the jet gases are upwardly directed relative to said engine.

5. A jet propulsion engine as claimed in claim 1 in which said exhaust valve means is movable between a first position in which it prevents the jet gases from flowing out of the downstream end of the jet pipe, but permits their passage through the exhaust duct, and a second position in which it permits the jet gases to flow out of the downstream end of the jet pipe but prevents their passage through the exhaust duct.

6. An engine as claimed in claim 5 in which the exhaust valve means comprises a part-spherical valve member carried by a part-cylindrical member which is pivotally mounted within the jet pipe.

7. A jet propulsion engine for an aircraft, said engine having a jet pipe and at least one stub pipe communicating laterally with the jet pipe at a point forward of the downstream end thereof, said stub pipe being short in length and serving as an additional exhaust duct, adjustable exhaust valve means mounted in said jet pipe for selectively deflecting jet gases flowing through the jet pipe into said exhaust duct, a jet propulsion nozzle carried by said exhaust duct through which the jet gases deflected by said exhaust valve means are discharged, said nozzle comprising a rotatable frame member, a plurality of substantially chordally arranged support members slidably connected to the frame member, and a plurality of parallel jet deflector vanes carried by the frame member, at least some of the deflector vanes being slidably connected to the support members, the deflector vanes serving for deflecting the jet gases discharged through said nozzle, and means for rotating said frame member relatively to said exhaust duct to alter the direction to which the jet gases are deflected by said deflector vanes, said frame member being adjustable to permit the jet gases to be deflected selectively forwardly, downwardly and rearwardly relative to said engine.

8. A jet propulsion engine for an aircraft, said engine being mounted in an engine nacelle, and having at least one additional exhaust duct communicating laterally with the jet pipe at a point forward of the downstream end thereof, adjustable exhaust valve means mounted in said jet pipe for selectively deflecting jet gases flowing through the jet pipe into said exhaust duct, a jet propulsion nozzle carried by said exhaust duct through which the jet gases deflected by said exhaust valve means are discharged externally of said engine nacelle, said nozzle comprising a rotatable frame member disposed closely adjacent said engine nacelle, a plurality of substantially chordally arranged support members slidably connected to the frame member, and a plurality of parallel jet deflector vanes carried by the frame member, at least some of the deflector vanes being slidably connected to the support members, the deflector vanes serving for deflecting the jet gases discharged through said nozzle, and means for rotating said frame member relatively to said exhaust duct to alter the direction to which the jet gases are deflected by said deflector vanes, said frame member being adjustable to permit the jet gases to be deflected selectively forwardly, downwardly and rearwardly relative to said engine.

9. In combination, a jet propulsion engine for an aircraft, an engine nacelle surrounding said engine, and a strut projecting externally of said engine nacelle for mounting the engine externally in a horizontal position on an aircraft, said engine having at least one additional exhaust duct communicating laterally with the jet pipe at a point forward of the downstream end thereof, adjustable exhaust valve means mounted in said jet pipe for selectively deflecting jet gases flowing through the jet pipe into said exhaust duct, a jet propulsion nozzle carried by said exhaust duct through which the jet gases deflected by said exhaust valve means are discharged externally of said engine nacelle, said nozzle comprising a rotatable frame member disposed closely adjacent said engine nacelle, a plurality of substantially chordally arranged support members slidably connected to the frame member, and a plurality of parallel jet deflector vanes carried by the frame member, at least some of the deflector vanes being slidably connected to the support members, the deflector vanes serving for deflecting the jet gases discharged through said nozzle, and means for rotating said frame member relatively to said exhaust duct to alter the direction to which the jet gases are deflected by said deflector vanes, said frame member being adjustable to permit the jet gases to be deflected selectively forwardly, downwardly and rearwardly relative to said engine.

10. An engine as claimed in claim 2 in which said deflector vanes extend transversely relatively to the support member, said at least some of the deflector vanes each having two ends, one end of which is rigidly secured to the frame member and the other end of which is longitudinally slidably connected to one of the support members.

(References on following page)

References Cited in the file of this patent

UNITED STATES PATENTS

| | | | |
|---|---|---|---|
| 2,464,724 | Sedille | Mar. 15, | 1949 |
| 2,527,732 | Imbert | Oct. 31, | 1950 |
| 2,529,973 | Sedille et al. | Nov. 14, | 1950 |
| 2,601,104 | Douglas | June 17, | 1952 |
| 2,635,420 | Jonker | Apr. 21, | 1953 |
| 2,849,861 | Gardiner et al. | Sept. 2, | 1958 |
| 2,857,740 | Hall et al. | Oct. 28, | 1958 |
| 2,879,014 | Smith et al. | Mar. 24, | 1959 |
| 2,912,188 | Singlemann et al. | Nov. 10, | 1959 |
| 2,933,891 | Britt | Apr. 26, | 1960 |
| 2,949,734 | Bertin et al. | Aug. 23, | 1960 |
| 2,964,905 | Hewson et al. | Dec. 20, | 1960 |
| 3,024,604 | Morley | Mar. 13, | 1962 |
| 3,076,309 | Brown et al. | Feb. 5, | 1963 |